US011863080B2

(12) United States Patent
Cabizza et al.

(10) Patent No.: US 11,863,080 B2
(45) Date of Patent: Jan. 2, 2024

(54) ACTIVE-CLAMPED ISOLATED SEPIC CONVERTER IN THE MHZ RANGE FOR LOW-POWER SUBNETS

(71) Applicant: Infineon Technologies AG, Neubiberg (DE)

(72) Inventors: Stefano Cabizza, Padua (IT); Giorgio Spiazzi, Padua (IT); Cristian Garbossa, Bressanone (IT)

(73) Assignees: Infineon Technologies AG, Neubiberg (DE); Università Degli Studi di Padova, Padua (IT)

( * ) Notice: Subject to any disclaimer, the term of this patent is extended or adjusted under 35 U.S.C. 154(b) by 73 days.

(21) Appl. No.: 17/651,137

(22) Filed: Feb. 15, 2022

(65) Prior Publication Data

US 2023/0318472 A1    Oct. 5, 2023

(51) Int. Cl.
| | |
|---|---|
| H02M 1/08 | (2006.01) |
| H02M 3/335 | (2006.01) |
| H02M 3/158 | (2006.01) |
| B60R 16/03 | (2006.01) |
| H02M 1/38 | (2007.01) |
| H02M 1/34 | (2007.01) |

(52) U.S. Cl.
CPC ......... *H02M 3/33592* (2013.01); *B60R 16/03* (2013.01); *H02M 1/083* (2013.01); *H02M 1/34* (2013.01); *H02M 1/38* (2013.01); *H02M 3/1588* (2013.01)

(58) Field of Classification Search
CPC .... H02M 3/33592; H02M 1/083; H02M 1/34; H02M 1/38; H02M 3/1588; B60R 16/03

USPC ....................................................... 307/10.1
See application file for complete search history.

(56) References Cited

U.S. PATENT DOCUMENTS

2012/0262954 A1\*  10/2012  Duvnjak ............. H02M 1/4258
                                                                  363/21.02

OTHER PUBLICATIONS

"Power MOSFET Basics: Understanding Gate Charge and Using it to Assess Switching Performance", Vishay, Revised Feb. 16, 2016, 6 pp.
Athalye et al., "High-Performance Front-End Converter for Avionics Applications", IEEE Transactions on Aerospace and Electronic Systems, vol. 39, No. 2, Apr. 2003, pp. 462-470.

(Continued)

*Primary Examiner* — Rexford N Barnie
*Assistant Examiner* — Xuan Ly
(74) *Attorney, Agent, or Firm* — Shumaker & Sieffert, P.A.

(57) ABSTRACT

An active-clamped isolated SEPIC DC-DC power converter (ACISC) to convert a DC voltage to supply a variety of DC loads. The single-ended primary-inductor converter (SEPIC) of the ACISC may be configured to perform both buck and boost converter functions. The ACISC of this disclosure may be configured to operate over a wide input voltage range to provide an output voltage for DC electronic loads supplied by the power converter. In the example of an automobile, a back-up twelve volt battery may output voltages to the ACISC over a wide voltage range, e.g., nine volts to eighteen volts. The wide input voltage range of the ACISC may be desirable when used as the converter for a back-up battery supply. The circuitry arrangement and component selection of the ACISC of this disclosure cause the power converter to operate in resonant DCM mode in the megahertz (MHz) frequency range.

20 Claims, 7 Drawing Sheets

(56) References Cited

OTHER PUBLICATIONS

Athalye et al., "Improving Efficiency of the Active-Clamped SEPIC Rectifier at High Line Frequencies", Twentieth Annual IEEE Applied Power Electronics Conference and Exposition, Mar. 6-10, 2005, pp. 1152-1157.
Cabizza et al., "Comparative Study of 48V-based Low-Power Automotive Architectures", 2020 IEEE 21st Workshop on Control and Modeling for Power Electronics (COMPEL), Nov. 9-12, 2020, 8 pp.
Watson et al., "Utilization Of An Active-Clamp Circuit to Achieve Soft Switching In Flyback Converters", IEEE Transactions on Power Electronics, vol. 11, No. 1, Jan. 1996, 8 pp.
Wu et al., "High Performance Active-Clamped Isolated Sepic PFC Converter with SiC Devices and Lossless Diode Clamp", IEEE Journal of Emerging and Selected Topics in Power Electronics, vol. 8, No. 1, Sep. 30, 2019, 11 pp.

\* cited by examiner

ACTIVE-CLAMPED ISOLATED SEPIC CONVERTER IN THE MHZ RANGE FOR LOW-POWER SUBNETS

TECHNICAL FIELD

The disclosure relates to direct current (DC) power converters.

BACKGROUND

Some systems include a variety of low power and low voltage electronic loads, such as sensors, microcontrollers and communication transceivers, that are supplied by a much higher voltage, e.g., two, five and perhaps ten times higher voltage and therefore convert the higher voltage down to values usable by the lower voltage loads. Examples of such systems may include vehicles, such as aircraft, automobiles and so on, in which a higher voltage source may be converted to a lower voltage for the lower voltage loads. In some examples, such systems may also include a backup DC source, such as a low voltage battery, in case there is a problem with the higher voltage supply. For example, some electric and hybrid automobiles may include a 48V main battery, which may power the vehicle motor and other high voltage loads. The 48V main battery may need to be converted to a lower voltage, such as twelve volts or twenty-four volts to power lower voltage loads. The vehicle may also include a backup battery, such as a twelve volt battery to supply the lower voltage loads if needed.

SUMMARY

In general, the disclosure describes an active-clamped isolated SEPIC DC-DC power converter (ACISC) to convert a DC supply voltage to supply a variety of DC loads. The single-ended primary-inductor converter (SEPIC) of the ACISC may be configured to perform both buck and boost converter functions. The ACISC of this disclosure may be configured to operate efficiently over a wide input voltage range to provide a stable output voltage for DC electronic loads supplied by the power converter. In the example of an automobile, a back-up twelve volt battery may output voltages to the ACISC over a wide voltage range, e.g., nine volts to eighteen volts. The wide input voltage range of the ACISC may be desirable when used as the converter for a back-up battery supply. The circuitry arrangement and component selection of the ACISC of this disclosure cause the power converter to operate in resonant DCM mode in the megahertz (MHz) frequency range.

In one example, this disclosure describes a power converter circuit comprising a transformer configured to isolate an output terminal of the circuit from an input terminal of the circuit, wherein the transformer includes a leakage inductance and a magnetizing inductance, a resonance capacitor in series with the leakage inductance, wherein a value of capacitance for the resonance capacitor, a value for the magnetizing inductance and a value for the leakage inductance configure the circuit to operate in resonant discontinuous conduction mode (DCM), a clamping switch, a main switch, and a loop controller configured to: drive control terminals of the main switch and the clamping switch, operate the power converter circuit with a dead time: wherein both the main switch and the clamping switch are off, and such that a voltage at the switch node transitions between a first voltage magnitude and a second voltage magnitude within the dead time.

In another example, this disclosure describes a system comprising a power supply configured to produce a voltage within a predetermined voltage range, a power converter circuit includes a transformer configured to isolate an output terminal of the circuit from an input terminal of the circuit, wherein the transformer includes a leakage inductance and a magnetizing inductance, and wherein the input terminal is configured to receive from the power supply, the voltage within the predetermined voltage range, a resonance capacitor in series with the leakage inductance, wherein a value of capacitance for the resonance capacitor, a value for the magnetizing inductance and a value for the leakage inductance configure the circuit to operate in resonant discontinuous conduction mode (DCM), a clamping switch, a main switch, and a loop controller configured to: drive control terminals of the main switch and the clamping switch, operate the power converter circuit with a dead time: wherein both the main switch and the clamping switch are off, and such that a voltage at the switch node transitions between a first voltage magnitude and a second voltage magnitude within the dead time.

In another example, this disclosure describes a method comprising receiving, at an input terminal, power within a predetermined voltage range, isolating an output terminal from the input terminal with galvanic isolation circuitry, wherein the galvanic isolation circuitry comprises a leakage inductance and a magnetizing inductance, operating in a resonant discontinuous conduction mode (DCM) based on an inductance value of the leakage inductance, an inductance value for the magnetizing inductance and a capacitance of a resonant capacitor in series with the leakage inductance, wherein the resonant capacitor connects a switch node to the galvanic isolation circuitry, wherein an input inductor connects the input terminal to the switch node, wherein a main switch connects to a clamping switch at the switching node and switching both the main switch and the clamping switch OFF during a dead time such that a voltage at the switch node transitions between a first voltage magnitude and a second voltage magnitude within the dead time.

The details of one or more examples of the disclosure are set forth in the accompanying drawings and the description below. Other features, objects, and advantages of the disclosure will be apparent from the description and drawings, and from the claims.

DETAILED DESCRIPTION

The circuitry of this disclosure comprises a single-ended primary-inductor converter (SEPIC) configured to perform both buck and boost converter functions to convert a DC supply voltage to supply a variety of DC loads. The SEPIC converter may be arranged as an active-clamped isolated SEPIC DC-DC power converter (ACISC) to configured to operate efficiently over a wide input voltage range. The selected output voltage for the DC electronic loads may be within the input voltage range. The transformer in the ACISC converter may also provide galvanic isolation to isolate an output terminal of the circuit from an input terminal of the power converter circuit.

The circuitry arrangement and component selection of the ACISC of this disclosure cause the power converter to operate in resonant DCM mode in the megahertz (MHz) frequency range, which may provide improved power density over other circuit arrangements. Specifically, the arrangement of the ACISC of this disclosure may include a capacitor located near the transformer, with the values for the transformer and capacitor selected to ensure the circuit operates in resonant discontinuous-conduction-mode (DCM) at a selected frequency. In discontinuous-conduction-mode (DCM), the current may fall to zero during part of the switching cycle. Continuous-conduction-mode (CCM) may refer to a mode where the current in the output rectifier, e.g., an output diode, never goes to zero between switching cycles. In some examples, DCM may offer higher efficiency than CCM, because of a reduced reverse recovery loss on the output diode and a softer turn on of the power switch for the power converter. DCM may also provide advantages including use of a smaller transformer for the same output, when compared to CCM operation, as well as a smaller input inductor, and therefore a reduced footprint. In some examples, the transformer in the circuit of this disclosure may be a planar transformer, to further reduce the size of the circuitry.

Figure 1A:
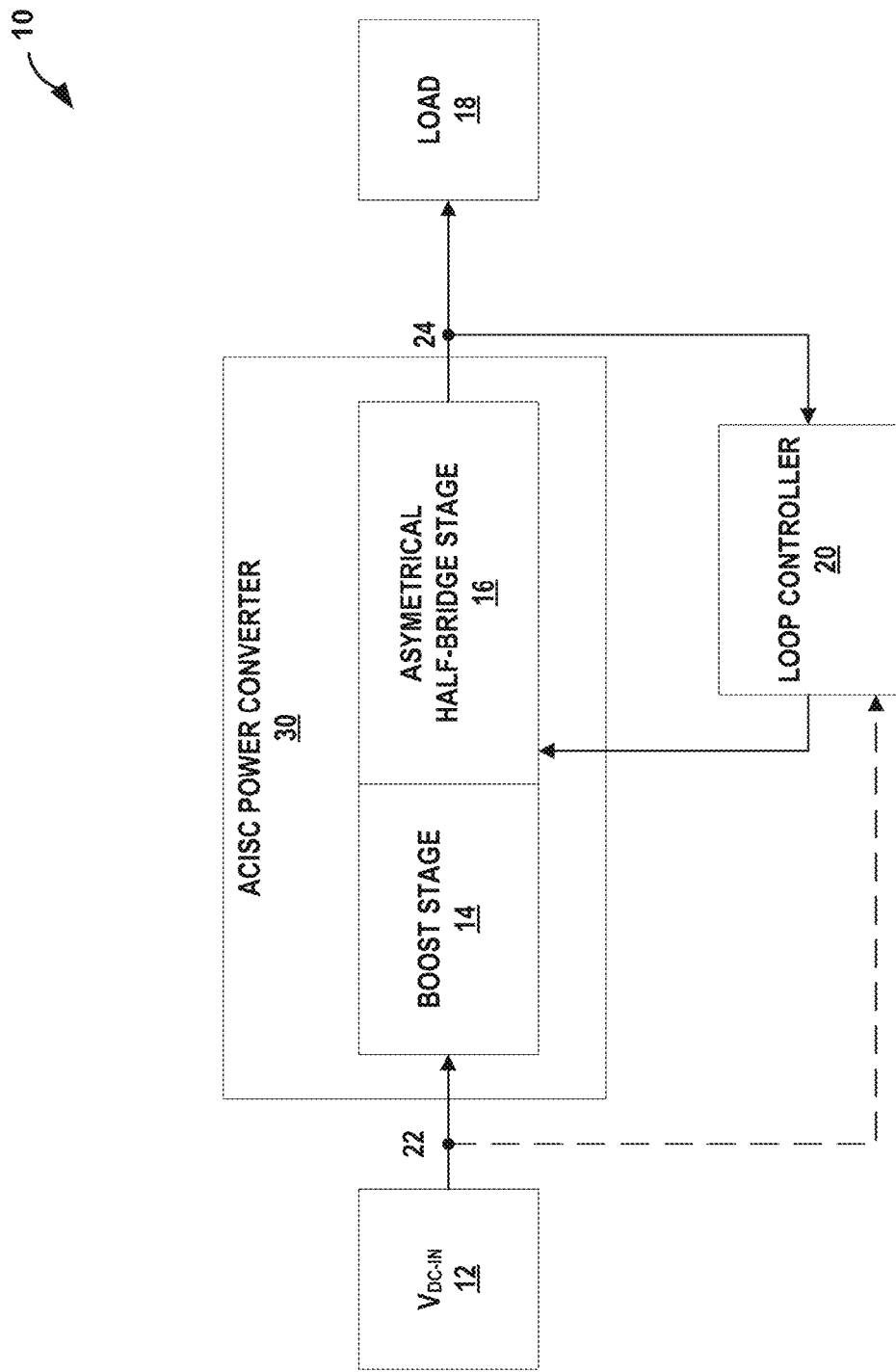
FIG. 1A is a block diagram illustrating an overview of an example power converter according to one or more techniques of this disclosure.

FIG. 1A is a block diagram illustrating an overview of an example power converter according to one or more techniques of this disclosure. System 10 includes ACISC power converter 30 supplied by a direct current (DC) source $V_{DC-IN}$ 12 and configured to supply load 18. System 10 also includes loop controller 20 which may monitor the output power, e.g., voltage and/or current to load 18 and output control signals to ACISC power converter 30 to maintain the output power within desired limits. In some examples, loop controller 20 may also monitor the input voltage $V_{DC-IN}$ 12.

Loop controller 20 may be implemented as any type of power converter loop controller, e.g., voltage mode controller, use an additional primary winding, opto-isolators and so on and may in some examples include processing circuitry, such as a microprocessor, logic circuitry, or some combination. In some examples loop controller 20 may be a separate integrated circuit connected to ACISC power converter 30.

In the example of FIG. 1A, ACISC power converter 30 includes boost stage 14 and asymmetrical half-bridge stage 16. For the power converter circuit of this disclosure, boost stage 14 may share some components with asymmetrical half-bridge stage 16 and are not simply two cascaded stages. Loop controller 20 may be configured to adjust the duty cycle of switches in half-bridge stage 16 to compensate for changes in the voltage provided by $V_{DC-IN}$ 12 to maintain the desired output voltage to load 18, which may be one or more DC sub-nets. In the example in which $V_{DC-IN}$ 12 is a battery, the voltage provided to ACISC power converter 30 may increase as $V_{DC-IN}$ 12 is charged and decrease over time as $V_{DC-IN}$ 12 discharges to provide power. The duty cycle output by loop controller 20 may increase as $V_{DC-IN}$ 12 voltage decreases, and vice-versa.

As described above, ACISC power converter 30 may be configured to operate in resonant DCM and may include circuitry, not shown in FIG. 1A, to provide galvanic isolation between input terminal 22 and output terminal 24, such as a coupled inductor, e.g., a transformer. The circuitry of ACISC power converter 30 may include a topology and component values for capacitors, inductors and so on to ensure zero voltage switching for switches in system 10. In this disclosure, zero voltage switching (ZVS) means that the voltage across the switch is zero volts during a switch transition from OFF to ON. As with any circuitry, "zero" may mean exactly zero volts or some tolerance about zero volts that is approximately equal to zero volts. The amount of the tolerance may vary based on a specific application. In the example of field effect transistor (FET) switches, the tolerance about zero volts may be based on a forward diode voltage of the body diode for the FET. When the voltage across the switch exceeds the body diode voltage drop, the body diode may conduct, but with a higher $R_{DS}$ than the $R_{DS-ON}$ of the switch. In this manner, switching the FET when the voltage across the switch is less than the body diode voltage drop may result in improved switching efficiency.

Figure 1B:
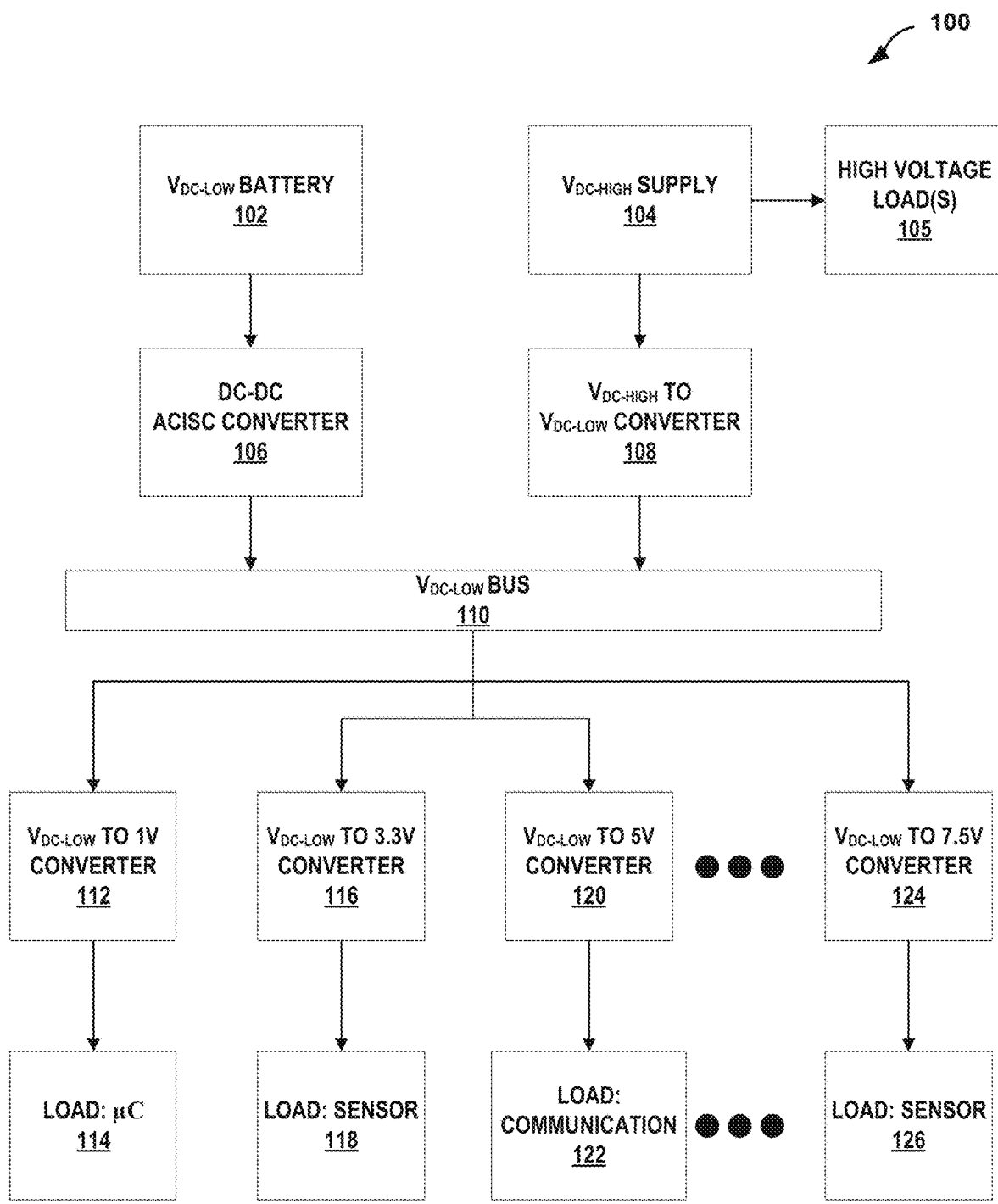
FIG. 1B is a block diagram illustrating an example application of the power converter of this disclosure in a system with at least two power supplies for low power subnets.

FIG. 1B is a block diagram illustrating an example application of the power converter of this disclosure in a system with at least two power supplies for low power subnets. In the example of system 100, $V_{DC-LOW}$ bus 110 may supply one or more DC subnets and receive power from $V_{DC-HIGH}$ supply 104 as well as from $V_{DC-LOW}$ battery 102. An arrangement similar to system 100 may be useful in a variety of applications including weather stations, vehicles such as unmanned aerial vehicles, urban air mobility vehicles, automobiles, and so on, as well as other types of applications.

$V_{DC-HIGH}$ supply 104 may provide power to one or more high voltage loads 105, such as an electric motor, and to $V_{DC-LOW}$ bus 110 via $V_{DC-HIGH}$ to $V_{DC-LOW}$ converter 108. $V_{DC-HIGH}$ to $V_{DC-LOW}$ converter 108 may be any type of DC-DC converter configured to reduce voltage to supply the loads of $V_{DC-LOW}$ bus 110. In the example of an electric or hybrid automobile, $V_{DC-HIGH}$ supply 104 may be a 48 V battery and $V_{DC-LOW}$ battery 102 may be a twelve volt back-up battery configured to provide power to $V_{DC-LOW}$ bus 110 via DC-DC ASISC converter 106, in the event of a problem with $V_{DC-HIGH}$ to $V_{DC-LOW}$ converter 108 or $V_{DC-HIGH}$ supply 104. DC-DC ASISC converter 106 is an example of ACISC power converter 30 described above in relation to FIG. 1A and may have the same functions and characteristics.

In the example of FIG. 1B, $V_{DC-LOW}$ bus 110 supplies several different loads through a variety of power supplies, which may also be called power converters. In other examples, ACISC converter 106 may supply power for more or fewer loads than shown in the example of FIG. 1B. For system 100, load 114 is a microcontroller, which runs on a voltage of one volt. Converter 112 may be any type of DC-DC converter configured to reduce the power supplied from $V_{DC-LOW}$ bus 110 to the one volt needed for the microcontroller. Similarly sensors 118 and 126 may receive power from $V_{DC-LOW}$ bus 110 through 3.3V converter 116 and 7.5V converter 124 respectively. A communication load 122, which may power a communication bus, like a CAN bus, or a wireless communication system such as Wi-Fi, BLUETOOTH or another type of communication system, may receive power via five volt converter 120.

Figure 2:
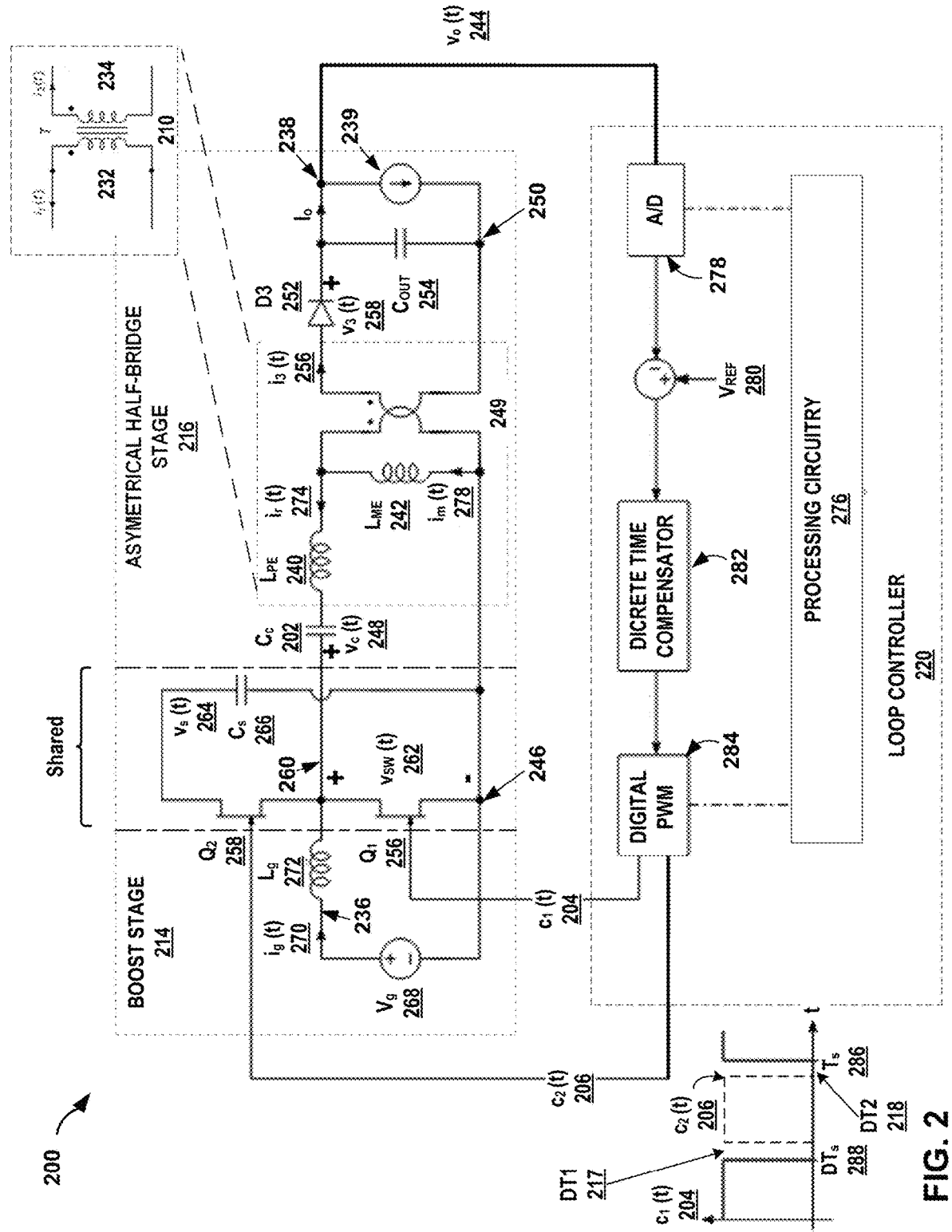
FIG. 2 is a schematic diagram illustrating an example circuit arrangement to implement the ACISC according to one or more techniques of this disclosure.

FIG. 2 is a schematic diagram illustrating an example circuit arrangement to implement the ACISC according to one or more techniques of this disclosure. System 200 is an example of system 10 and ACISC converter 106 described above in relation to FIGS. 1A and 1B, respectively, and may have the same or similar functions and characteristics. For example, similar to system 10 of FIG. 1, system 200 is an ACISC power converter that integrates boost stage 214 and asymmetrical half-bridge stage 216 and includes loop controller 220.

The physical structure of the example system 200 may include transformer 210, which may also be described as coupled inductors, or a primary coil 232 and secondary coil 234 with a specified turns ratio, e.g., the ratio of the number of turns in the primary compared to the secondary turns. Transformer 210 may be configured to provide galvanic isolation between input terminal 236 and output terminal 238. In the example of FIG. 2, transformer 210 is modeled as leakage inductance Lpe 240 and magnetizing inductance Lme 242.

Physically, primary coil 232 may connect to resonance capacitor Cc 202 and to reference node 246. As modeled, a first terminal of leakage inductance Lpe 240 connects resonance capacitor Cc 202 to magnetizing inductance Lme 242. Lme 242 connects a second terminal of Lpe 240 to reference node 246. Similarly the primary side of windings 249, which in the example of system 200, connects across Lme 242 between reference node 246 and the second terminal of Lpe 240. The secondary side of windings 249 connects between secondary reference node 250 and the anode of output diode D3 252. In some examples, transformer 210 may comprise single primary and single secondary winding. Such an arrangement may provide advantages, such as reduced footprint, cost and complexity over other types of power converter circuits with multiple windings. In other examples, transformer 210 may include a second primary winding, for example, as part of the loop control circuitry.

Transformer 210, in the example of FIG. 2, is modeled by an equivalent primary-side leakage inductance (Lpe 240), an equivalent primary-side magnetizing inductance (Lme 242), and an equivalent turns ratio (N). The equivalent turns ratio for windings 249, labeled "N" in this disclosure, may be different than the physical turns ratio of the actual transformer and is based on characterizing the physical transformer. Modeling the transformer may include taking measurements of the physical transformer to determine an equivalent turns ratio, N, as well as the equivalent magnetizing inductance, Lme 242, and other parameters to be used in modeling the circuitry of system 200.

In the example of FIG. 2, output diode D3 252 may rectify output voltage $v_o$ (t) 244. In other examples, synchronous rectification circuitry, e.g., a switch and control circuitry, not shown in FIG. 2, may replace output diode D3 252 and perform the rectification of output voltage $v_o$ (t) 244. The voltage across output diode D3 252 is $v_3$ (t) 258 and the current through the secondary windings, and through D3 252 is $i_3$ (t) 256. Output capacitor Cout 254 connects between the cathode of D3 252 and reference node 250. The cathode of D3 252 connects to output terminal 238, which outputs $v_o$ (t) 244, and load 239 connects between output terminal 238 and secondary reference node 250.

The ACISC converter of system 200 includes main switch Q1 256 and clamping switch Q2 258. Main switch Q1 256, which may also be referred to as primary switch Q1 256, connects between reference node 246 and switch node 260. The voltage across Q1 256 is switch node voltage $v_{sw}$ (t) 262. Switch node 260 may also be referred to as switching node 260 in this disclosure.

Clamping switch Q2 258 connects switch node 260 to reference node 246 through capacitor Cs 266. In some examples capacitor Cs 266 may be referred to as a snubber capacitor. Snubber circuitry may help protect the switch from the energy stored in the leakage inductance of the transformer, and may reduce the EMI caused by resonance between the leakage inductance of the primary inductor and the parasitic capacitance of the switch. System 200 may be considered a SEPIC converter with an added active clamping circuit provided by Q2 258 and Cs 266. The active clamping function may help control high voltage spikes in the components to avoid overstress of the components. The voltage across capacitor Cs 266 is $v_s$ (t) 264. In the example of FIG. 2, boost stage 214 includes input inductor Lg 272, main switch Q1 256, clamping switch Q2 258 and capacitor Cs 266. In other words, main switch Q1 256, clamping switch Q2 258, and capacitor Cs 266 are shared between boost stage 214 and asymmetrical half-bridge stage 216.

In some examples, because the value of Cc 202 may be selected with a small value of capacitance, to allow for the resonant operation, the voltage ripple across Cc 202 may be large enough to have a measurable impact on the gain. Simply assuming the voltage across Cc 202 is the average voltage, e.g., Vc=Vg, may result in an error between calculated/simulation performance and actual performance. In some examples, a calculated value for the voltage gain, M, of the ACISC converter of system 200 may be shown by the following equation:

$$M = \frac{V_o}{V_g} = \frac{k_1/[N(1-D)]}{(1-D)(1+\lambda) + k_1\left[k_2 + \frac{k_3}{NV_o}\right]}$$

where:

$$k_1 = \frac{f_s}{\omega_{ro}} \frac{\sin\alpha\sin\beta}{(1-\cos\alpha\cos\beta)} \tan\frac{\alpha}{2}$$

$$k_2 = 1 + Z_r \frac{1-D}{2f_sL_{me}}(1-\gamma)\cot\frac{\alpha}{2}$$

$$k_3 = Z_r \frac{I_o}{N}(1+\gamma)\cot\frac{\alpha}{2}$$

$$\gamma = \sqrt{\frac{1+\lambda}{\lambda}} \cot\frac{\alpha}{2}\tan\frac{\beta}{2}$$

and where λ as the ratio between the equivalent leakage inductance Lpe and the equivalent magnetizing inductance Lme, e.g., λ=Lpe/Lme, β=$\omega_{ro}$DTs, α=$\omega_r$(1−D)Ts, $f_s$ is the switching frequency, D is the duty cycle of the main switch, Ts is the switching period, Zr is the characteristic impedance, $\omega_r$ is the natural resonant frequency when D3 252 is ON, $\omega_{ro}$ is the natural resonant frequency when D3 252 is OFF, and Vo is the desired output voltage.

$$\omega_r = \frac{1}{\sqrt{L_{pe}C_c}}$$

$$Z_r = \sqrt{\frac{L_{pe}}{C_c}}$$

$$Z_{ro} = \sqrt{\frac{L_{pe}+L_{me}}{C_c}}$$

$$\omega_{ro} = \frac{1}{\sqrt{(L_{pe}+L_{me})C_c}}$$

The input voltage supply is Vg 268, which is an example of source $V_{DC-IN}$ 12 and $V_{DC-LOW}$ battery 102 described above in relation to FIGS. 1A and 1B. Input supply Vg 268 provides power to input terminal 236. Input current $i_g(t)$ 270 also enters the power converter circuit of system 200 at input terminal 236 and flows through input inductor Lg 272 to switch node 260. Resonance current $i_g(t)$ 274 flows to switch node 260 through resonance capacitor Cc 202 and leakage inductance Lpe 240. Magnetizing current $i_m(t)$ 278 flows through magnetizing inductance Lme 242 in the model of system 200.

In the example of FIG. 2, loop controller 220 may monitor the output power, e.g., output voltage $v_o(t)$ 244 and/or current to load 239. In the example of FIG. 2, load 239 is depicted as an active load. In other examples. load 239 may be replace by a resistive load Based on the output voltage, loop controller 220 may output control signals $c_1$ 204 and $c_2$ 206 to the control terminals of the switches of ACISC power converter 200 to maintain the output power within desired limits. In the example of FIG. 2, loop controller 220 includes processing circuitry 276, analog to digital converter 278, discrete time compensator 282, and digital pulse width modulation driver 284. In some examples, loop controller 220 may also include logic circuitry. In other examples, loop controller 220 may comprise other components and arrangements, including opto-couplers, and similar components.

Loop controller 220 may adjust dead time for switches Q1 256 and Q2 258 to ensure zero voltage switching for switches Q1 256 and Q2 258, where ZVS means that the voltage across the switch is zero volts during a switch transition from OFF to ON, as described above in relation to FIG. 1A. In other words, loop controller 220 may drive the control terminals of main switch Q1 256 ($c_1$ (t) 204) and clamping switch Q2 258 ($c_2$ (t) 206) to operate the power converter circuit with dead times DT2 218 and DT1 217. During the dead time interval, e.g., dead time duration, both main switch Q1 256 and clamping switch Q2 258 are OFF (not conducting through the main D-S channel). The dead time interval is such that a voltage at switch node 260 transitions between a first voltage magnitude (e.g., Vs) and a second voltage magnitude (approximately zero volts), and vice versa, within the dead time.

ZVS may be desirable, e.g., to turn on the switch before voltage at the switching node increases enough to cause the body diode to conduct, because in some examples, such as examples with GaN switches, body diode conduction may result in a decrease in converter efficiency, when compared to turning on the switch, as described above. In other words, main switch Q1 256 connects switch node 260 reference node 246 and loop controller 220 may switch ON Q1 256 when the voltage at switch node 260 is the same as the reference node 246, e.g., approximately zero volts. As described above the voltage at switch node 260 is approximately zero volts when the voltage is within a specified tolerance of zero volts, e.g., some specific value based on the application for system 200, a body diode forward voltage or some other tolerance value.

Similarly, loop controller 220 may switch Q2 258 when the voltage across switch Q2 258 is approximately zero volts, or within a specified tolerance of zero volts, as described above. For example, loop controller 220 may switch ON clamping switch Q2 258 when the voltage at switch node 260 equals a voltage across snubber capacitor Cs 266. In the example of FIG. 2, switch node voltage $v_{sw}(t)$ 262 transitions between 0V and Vs=Vg/(1−D) and viceversa, as noted above. Vs is the average voltage across the snubber capacitor Cs 266. Because the voltage ripple across Cs 266 is negligible, in the example of system 200, $v_s(t)$ 264 can be assumed to be equal to the average voltage Vs, during the switching cycle. As with the description of "equals zero" described herein, "equals a voltage" may also include being within a specified tolerance of the voltage, e.g., a percentage, a range of values, and so on.

The values for the components, along with the circuit topology, and dead time regulation may ensure ZVS for resonant DCM operation. Input inductance Lg 272 charges and stores energy when main switch Q1 256 is ON. When main switch Q1 256 is OFF, input inductance Lg 272 provides the stored energy to capacitor Cs 266. The value of Lg 272 may be selected to work with the selected values for Cc 202, Lpe 240, magnetizing inductance Lme 242 as well as parasitic inductance, capacitance and resistance of circuitry of system 200 to achieve ZVS during resonant DCM operation.

The input current, $i_g$ (t) 270 flows through the input inductor Lg 272 and through either Q1 256 or Q2 258 during the switching cycle. To achieve zero voltage switching for Q1 256, the net current entering switch node 260, e.g., $i_L(t) \triangleq i_g(t)+i_r(t)$ should be in the range as specified by the following equation:

$$i_L(T_s) < -\frac{C_{eq.Q}}{t_{DT}}V_s$$

where $i_L(T_s)$ is the value of the net current into switch node 260 at the end of the period Ts 286, $C_{eq.Q}$ is the charge equivalent capacitance at switch node 260, and Vs is the starting voltage at switching node 260 at the beginning of the period. Switch node 260 should transition from the starting voltage Vs to the reference node voltage 249 within the period t DT to achieve ZVS across a switch.

In the example of FIG. 2, loop controller 220 may provide two dead-times. For switch Q1 256, the first voltage level may be Vs and switching node 260 should transition to a second voltage level of approximately zero volts for Q1 256 to switch with zero volts across Q1 256, and the desired dead time for this transition may be found using the equation above for $i_L(T_s)$. Therefore, loop controller 220 may be configured to set the dead time for the transition for Q1 256 in the switching cycle to be at least $t_{DT}$. Similarly, for clamping switch Q2 258, the first voltage level may be zero volts and the second voltage level may be Vs, and the dead time may be determined by rearranging the equation above before switching Q2 258.

In the example of system 200, Vs=Vg/(1−D), where D is the duty cycle of main switch Q1 256. Loop controller 220 may be configured to adjust the duration of the dead time depending on the selected operating region and the selected values for components in the circuitry of system 200, as well as the charge equivalent capacitance for switch node 260. The charge equivalent capacitance $C_{eq \cdot Q}$ may include any parasitic capacitance associated with switches Q1 256, Q2 258 and other parasitic capacitance connected to switch node 260.

In some examples, reducing the magnitude of the total rms current entering the switching node may improve efficiency of circuit 200 by reducing the conduction losses of switches Q1 256 and Q2 258. Converter circuit 200 operates in resonance DCM and stays in resonance during the switching period. The voltage of switch node 260 varies based on Vg 268, D and Cs 266, which varies from 0V (at 249) to the voltage across the snubber capacitor Cs 266, e.g., vs(t) 264. The shape and timing of the voltage curve at switch node 260 may depend on the selected values for inductance connected to the switching node, as well as the charge equivalent capacitance $Ceq_{\cdot Q}$ of switch node 260. For the resonant DCM, the dead time duration is controlled by loop controller 220 to allow the power converter portions of circuit 200 to autonomously transition the voltage of switching node 260 to achieve ZVS for both main switch Q1 256 and clamping switch Q2 258. In some examples, loop controller 220 may be configured to regulate a dead time that is as short as feasible, but set long enough for the circuit to autonomously transition the voltage of the switching node from zero to Vs and vice versa to ensure ZVS. Some examples of values may be found in table 1 below. In other examples, an ACISC according to this disclosure may have different values depending on the application, load requirements, input voltage, desired gain and other factors:

TABLE 1

Example Converter Parameters

| Parameter | Symbol | Example Values |
|---|---|---|
| Input Inductance | Lg | 2.4 μH |
| Equivalent primary leakage inductance | Lpe | 75.2 nH |
| Equivalent magnetizing inductance | Lme | 1.2 μH |
| Equivalent transformer turns ratio | N | 0.97 |
| Resonant capacitor | Cc | 47.8 nF |
| Clamping/Snubber Capacitor | Cs | 1 μF |
| Output capacitor | Co | 10 μF |
| Operating frequency | $f_s$ | 2 MHZ |

In the example of FIG. 2, the ACISC power converter may operate at frequencies greater than one megahertz (MHz). In some examples, the voltage transition time may be in a few nano seconds. The amount of current available at switch node 260 at the switching instant for a switch may also affect the voltage transition time and the amount of needed dead time to charge and discharge $Ceq_{\cdot Q}$.

In some examples the ACISC power converter may operate at frequencies greater than 1.6 MHz, e.g., two MHz, three MHz and so on. For automobile applications, operating at frequencies greater than 1.6 MHz may avoid electromagnetic interference (EMI) with AM and FM band, which may be desirable for electric or hybrid automobiles, e.g., to reduce the cost and complexity of shielding, damping and so on for frequencies in the AM and FM band.

As described above, the selection of the components, along with the topology of the circuit may impact parasitic factors for switch node 260 and affect the resonance behavior of system 200. For portions of the switching cycle magnetizing inductance Lme 242 may affect the resonance, and therefore the voltage behavior of nodes in system 200. When output diode D3 252 is OFF, magnetizing inductance Lme 242 participates in the resonance value because the magnetizing inductance Lme 242 is connected in series with the leakage inductance Lpe 240, when output diode D3 252 is OFF. When D3 252 is ON, constant voltage across magnetizing inductance Lme 242 is −N*Vout, where N is the modeled equivalent transformer turns ratio, described above in relation to FIG. 1. Therefore magnetizing inductance Lme 242 does not participate in resonance and only Cc 202 and leakage inductance Lpe 240 contribute to the resonance. When Q2 258 is ON, assuming a negligible ripple across Cs 266 then Cs 266 does not participate in the resonance because Cs 266 has a "constant" voltage when Q2 258 is ON. In other words, the resonance, which affects the timing and shape of the voltage waveform at switch node 260, may change through the switching cycle.

The switching speed of a MOSFET may be affected by the geometry of the transistor, e.g., the size. The smaller a transistor, the less capacitance the transistor may have between the gate (control terminal) and the source, which may result in faster switching speed compared to larger transistors. In this disclosure, switching describes changing the state of the transistor from closed, or an ON state to an open switch or OFF state, and vice versa. Also the output impedance of the source driving the base or the gate of the transistors may impact switching speed. Because the control terminal of a switch may include some amount capacitance to be charged or discharged, a large output impedance of the source may slow down the charging process and the switching speed. Charge is capacitance multiplied by voltage, (Q=CV), so switching speed may also depend on the gate capacitance and the voltage.

In some examples, the semiconductor components of the ACISC of this disclosure may include Gallium Nitride (GaN) components. GaN is a high electron mobility semiconductor (HEMT) and GaN transistors may provide faster switching and smaller size than silicon MOSFETs. In some examples, the ACISC of this disclosure may allow faster switching than other circuit arrangements, and therefore higher efficiency, and smaller circuit board space needed to implement the circuit. GaN transistors may provide a low inductance, low resistance, smaller and low-cost packages, when compared to other types of semiconductor components. In addition, GaN transistors may offer higher performance in both hard switching and soft-switching applications, when compared to other types of components. In the example of an electric vehicle application, any improvement in efficiency may increase the time required between charging sessions, which may be beneficial to a user of an electric vehicle.

The ACISC topology and operation of this disclosure may provide advantages compared to other types of SEPIC circuits. Some examples of isolated SEPIC rectifier may suffer from the disadvantage of low efficiency caused by hard switching (this is why other types of SEPIC circuits are not able to operate at such high switching frequencies), diode reverse recovery, transformer proximity losses, and losses due to energy stored in the transformer's leakage inductance. In contrast, the active clamp topology, and operation details, e.g., switching times, may provide advantages over other SEPIC circuits, including improved the efficiency of SEPIC and clamp the turn-off voltage spike on transformer 210.

Figure 3:
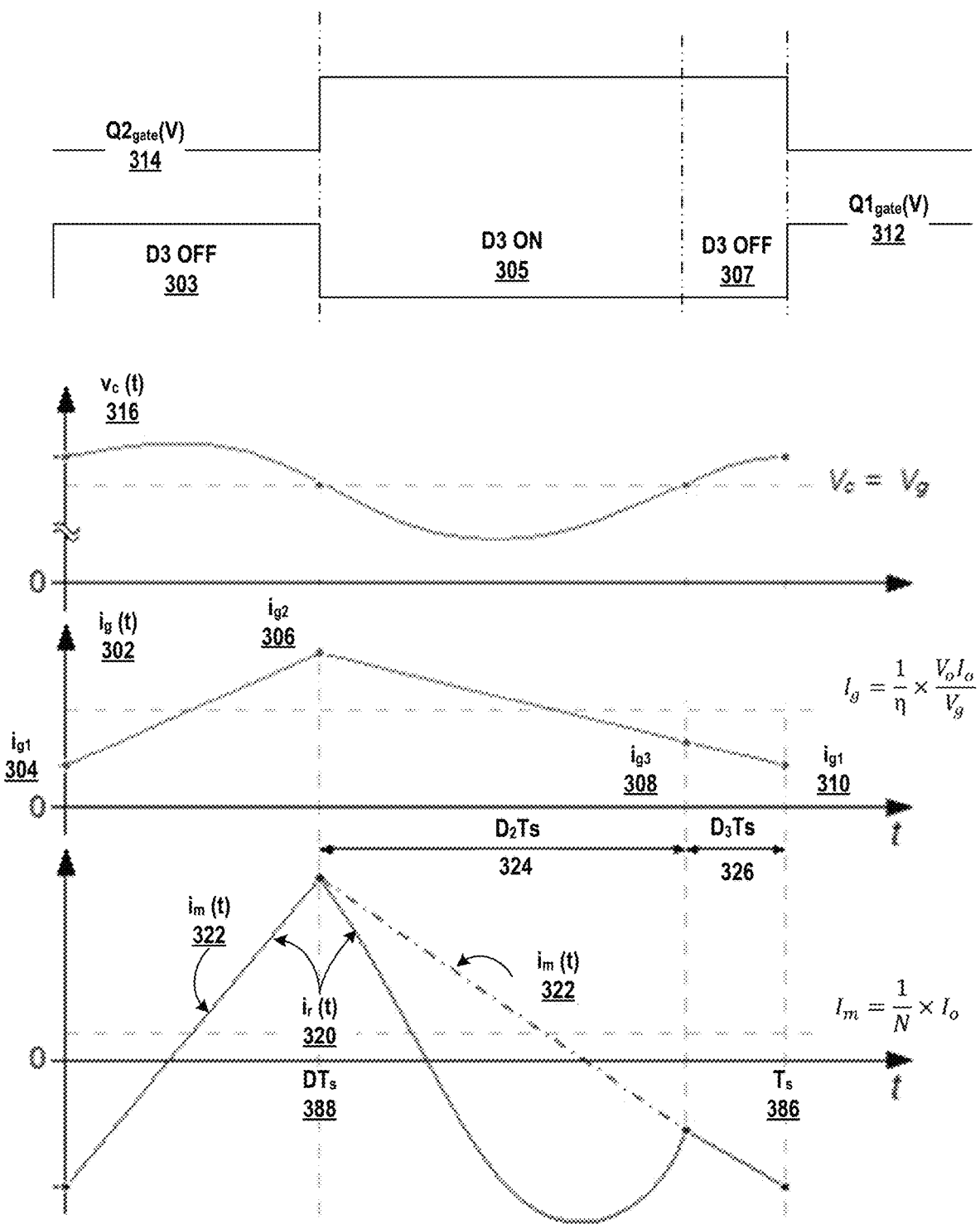
FIG. 3 includes time charts illustrating example circuit performance for the ACISC of this disclosure.

FIG. 3 includes time graphs illustrating example circuit performance for the ACISC of this disclosure. The time graphs of FIG. 3 show examples of some signals of the circuits described above in relation to FIGS. 1A, 1B and 2. The voltages, currents and components listed in FIG. 3 correspond similar voltages, currents and components described above in relation to FIG. 2. To show the trend of the circuit waveforms, the example of FIG. 3 assumes that the loop controller drives the main switch and clamping switch in a complementary pattern, without a dead time, e.g., when Q1 is ON, then Q2 is OFF, as shown by Q1gate 312 and Q2gate 314. In other examples, as described elsewhere in this disclosure, the loop controller may output the gate control signals Q1gate 312 and Q2gate 314, which may include a dead time to allow the voltage to transition so that the switches may operate with ZVS.

Input current $i_g(t)$ 302 is linear increasing from $i_{g1}$ 304 to $i_{g2}$ 306 and linear decreasing through $i_{g3}$ 308 back to $i_{g1}$ 310. In the example of FIG. 3, D is the duty cycle of main switch Q1 256 and Ts is the switching period. The voltage of the switching node may vary based on the selected values for inductance connected to the switching node, as well as the charge equivalent capacitance $C_{eq,Q}$, of the switching node, as described above in relation to FIG. 2. In some examples, the input current $i_g$ (t) may cross the average magnitude of input current described by the following equation:

$$I_g = \frac{1}{\eta} \times \frac{V_o I_o}{V_g}$$

where η is the efficiency of the ACISC converter, Vo is the desired output voltage, Io is the output current and Vg is the input voltage.

The voltage v c (t) 316 across the resonance capacitor, e.g., Cc 202 of FIG. 2 varies over the switching cycle and crosses the magnitude of the input voltage Vg. The resonance current $i_r(t)$ 320 passes through the resonance capacitance and the leakage inductance, e.g., Lpe 240 and Cc 202 of FIG. 2. Resonance current $i_r(t)$ 320 and magnetizing current $i_m(t)$ 322 increase in a resonant manner. When the natural resonant frequency is much less than $2\pi f_s$ ($\omega_{ro} \ll 2\pi f_s$), then the currents may increase almost linearly. Magnetizing current $i_m(t)$ 322 crosses the average magnitude of magnetizing current described by the following equation:

$$I_m = \frac{1}{N} \times I_o$$

In the example of FIG. 3, resonance may always be present in each subinterval. In the subinterval from 0 to DTs, both Lpe and Lme (depicted in FIG. 2) participate in the resonance because D3 is OFF and currents $i_r(t)$ 320 and $i_m(t)$ 322 increase in a resonant manner. The currents may increase almost linearly if the following condition is verified: $\omega_{ro} \ll 2*pi*fs$, where $\omega_{ro}=1/sqrt\{(Lpe+Lme)Cc\}$, also described above in relation to FIG. 2. The output diode conducts (D3 ON 305) only during D2Ts 324 and not during the rest of the switching interval (D3 OFF 303 and D3 OFF 307). Waveforms $i_r(t)$ 320 and $i_m(t)$ 322 are equal during the first interval when the diode D3 is OFF, because Lme is connected in series with Lpe.

From DTs 388 to (D+D2)Ts only Lpe participates to the resonance because D3 is ON so there is a constant voltage across Lme. The current $i_r(t)$ 320, which is different from $i_m(t)$ 322 shows the resonance behavior during D2Ts 324 shown in FIG. 3. From (D+D2)Ts to Ts, both Lpe and Lme participate to the resonance because D3 is OFF, as described above as well as in relation to FIG. 2. If the resonant current $i_r(t)$ 320, during its oscillation, becomes equal to the magnetizing current $i_m(t)$ 322 before the end of the switching period, as shown in FIG. 3, the rectifier diode D3 turns OFF, thus making subinterval D3 Ts 326 to appear, as in FIG. 3. The shape of $i_r(t)$ 320 shown in FIG. 3 represents one example of resonant DCM mode. The shape of $i_r(t)$ 320 may have a different (but similar) trend if we choose different values for the components of the ACISC, e.g., as depicted in FIG. 2. Note that because output diode D3 only conducts for a portion of the (1−D)Ts interval then the converter operates in DCM. In other examples, if the output diode D3 conducts for the entire (1−D)Ts interval (D2 Ts=(1−D)Ts), the converter operates in CCM.

Figure 4:
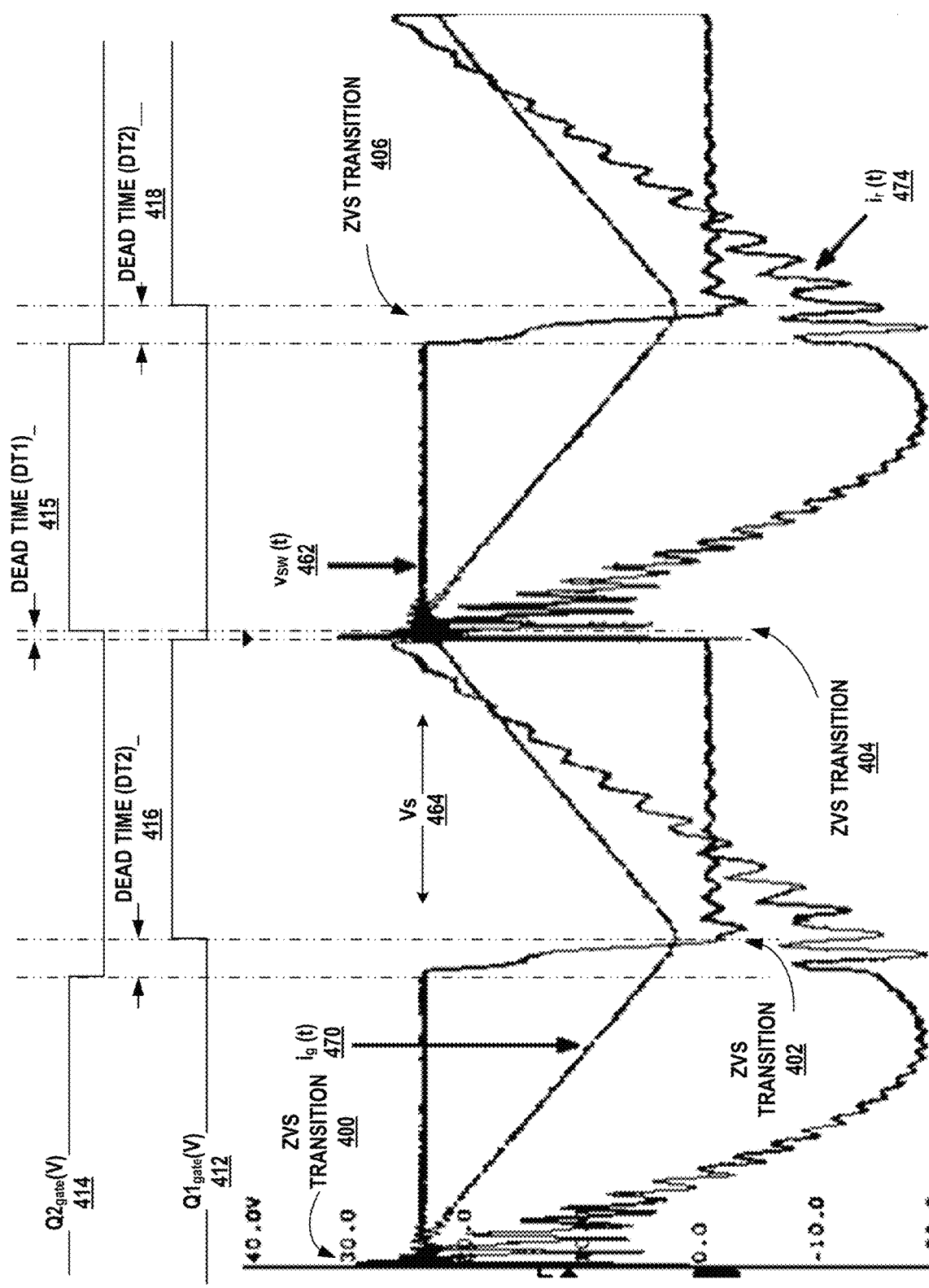
FIG. 4 is a time chart illustrating example resonance and ZVS operation for an example power converter circuit according to one or more techniques of this disclosure.

FIG. 4 is a time chart illustrating example resonance and ZVS operation for an example power converter circuit according to one or more techniques of this disclosure. Similar to FIG. 3, the time graphs of FIG. 4 show examples of some signals of the circuits described above in relation to FIGS. 1A, 1B and 2. The voltages, currents and components listed in FIG. 4 correspond similar voltages, currents and components described above in relation to FIGS. 2 and 3.

As described above in relation to FIG. 3, input current $i_g(t)$ 470 is linear increasing and linear decreasing. The loop controller may control the switches to include dead time 416 and dead time 418, as well as dead time 415, in which both the main switch Q1 and clamping switch Q2 are switched OFF, as indicated by gate control signals Q1gate 412 and Q2 gate 414. Switch node voltage $v_{sw}$ (t) 462 fully transitions from a first voltage magnitude (e.g., Vs 464) to a second voltage magnitude (e.g., zero volts) within the dead time periods 416 and 418. This allows the main switch Q1 to be switched ON with ZVS (402 and 406), because the voltage at the switch node approximately equals the voltage at the reference node, as described above in relation to FIG. 2. As described in detail herein, the term "equals" may refer to equality to within a tolerance of value, or a situation where values are "approximately equal." In other words, the switch voltage may equal zero within manufacturing, measurement and circuit performance tolerances. As shown by FIG. 4, $v_{sw}$ (t) 462 varies about zero volts, but the variance is small compared to the other operating voltage magnitudes for $v_{sw}$ (t) 462 and may thus be within circuit performance tolerances of zero for this application.

Similarly, dead time 415 (DT1) allows time for $v_{sw}$ (t) 462 to transition from a first voltage magnitude, zero volts in the example of FIG. 4, to a second voltage magnitude of approximately Vs 464. As with the description of main switch Q1 above, FIG. 4 shows $v_{sw}$ (t) 462 varying about Vs 464 during ZVS transition 404, but may be within circuit performance tolerances of Vs 464 for this application. Therefore, as described above in relation to FIG. 2, the voltage across clamping switch Q2 may be considered zero volts during switching, and therefore provide efficiency and other performance advantages as described above.

The current at the switch node includes a sum of currents injected into SW node from, for example, $i_g(t)$ 470 and $i_r(t)$ 474. At the ZVS transitions 400 and 404, both $i_g(t)$ 470 and $i_r(t)$ 474 are at high electrical current magnitude, when compared to ZVS transitions 402 and 406. With more available current at the switch node, the circuit may charge (or discharge) the charge equivalent capacitance $Ceq,_Q$ of the switch node, as described above in relation to FIG. 2. Therefore the voltage transitions from zero volts to, for example Vs 464 in the example of FIG. 4, may have a faster slew rate, e.g., a faster voltage transition time when compared to the voltage transitions from Vs 464 to zero volts. In other words, the switch node may have lower current, so more time may be needed from for the transition from high to low to charge and discharge the equivalent capacitance, $Ceq,_Q$.

As described above in relation to FIGS. 1A-3, the ACISC of this disclosure may include components so that the switching node has time to autonomously complete the transition from zero volts to Vs and vice versa. The topology, component selection and loop controller settings create the condition that the switching node is within a tolerance of zero volts across the main switch, and the clamping switch before performing switching operation. In other words, the controller may be configured with the duration of dead times (DT2) as depicted by 416, and 418 for main switch Q1 and dead time (DT1) for clamping switch Q2 as depicted by 415, while the component selection and topology ensure the switching node voltage completes the transition within the dead time.

Figure 5A:
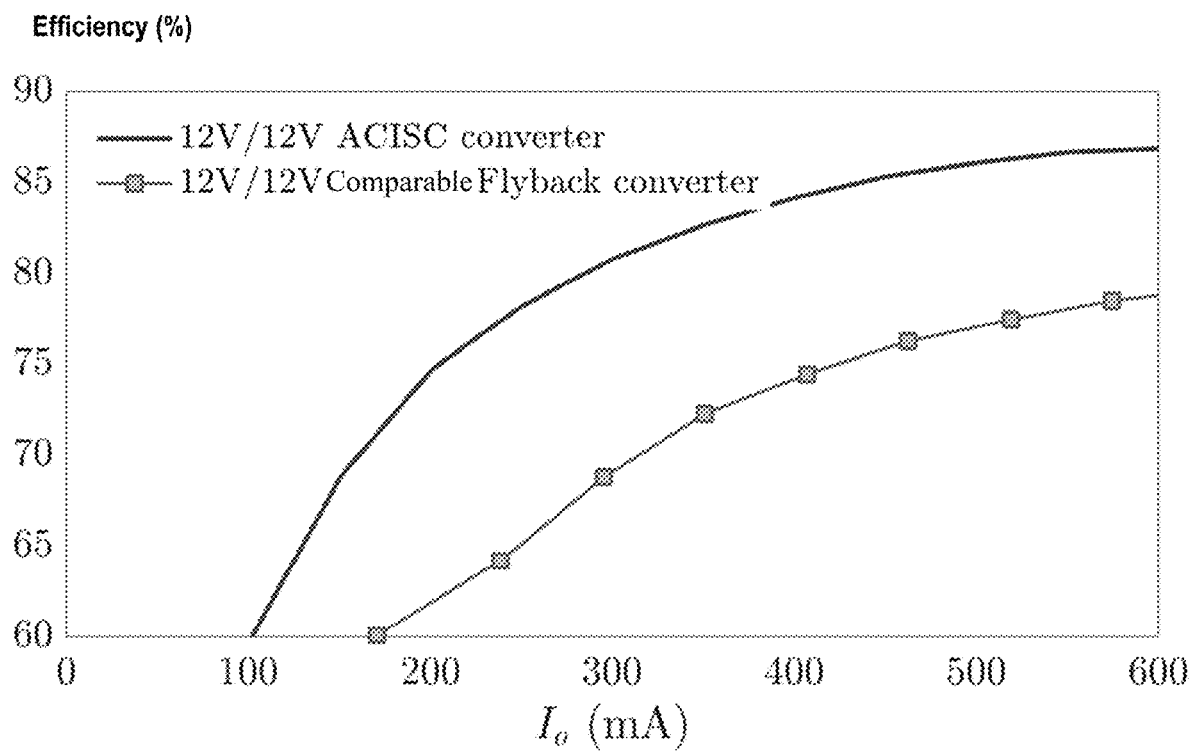
FIGS. 5A and 5B are graphs illustrating a comparison of efficiency for ACISC to a flyback power converter configured for similar low-power applications.
Figure 5B:
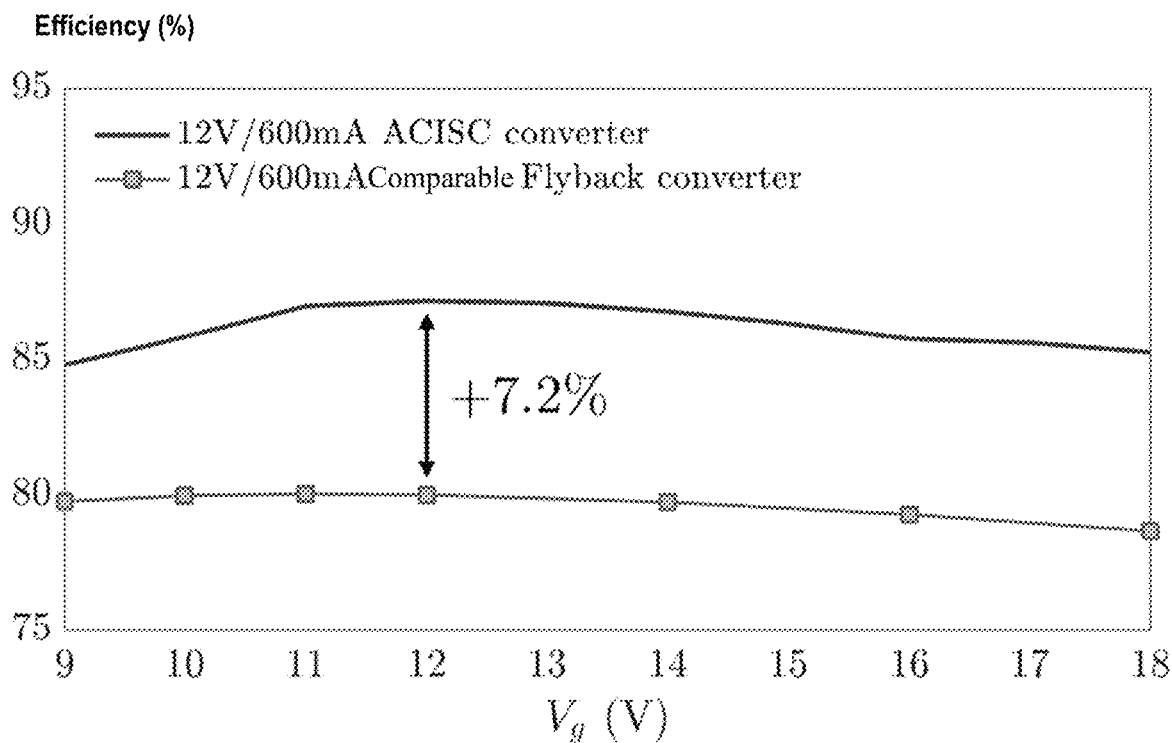

FIGS. 5A and 5B are graphs illustrating a comparison of efficiency for ACISC to a flyback power converter configured for similar low-power applications. The graphs of FIGS. 5A and 5B compare the efficiency of an example GaN-based active-clamped isolated SEPIC converter operating at two MHz, with that of a 400 kHz silicon-based comparable flyback converter intended for the same application and having the same input/output voltage and rated current specifications. The comparison, carried out as a function of both input voltage Vg and output current Io, reveals a peak efficiency profile of the designed ACISC converter of ~87.15% at Vo=12V and Io=600 mA, which is approximately 7.2% better than the comparable flyback converter, and the ACISC operates with a fivefold increase in switching frequency. Improved efficiency may be desirable for many applications, including system powered by battery power. Improved efficiency may result in longer operating life on a single charge and fewer recharge cycles when compared to systems with less efficient power converters.

Figure 6:
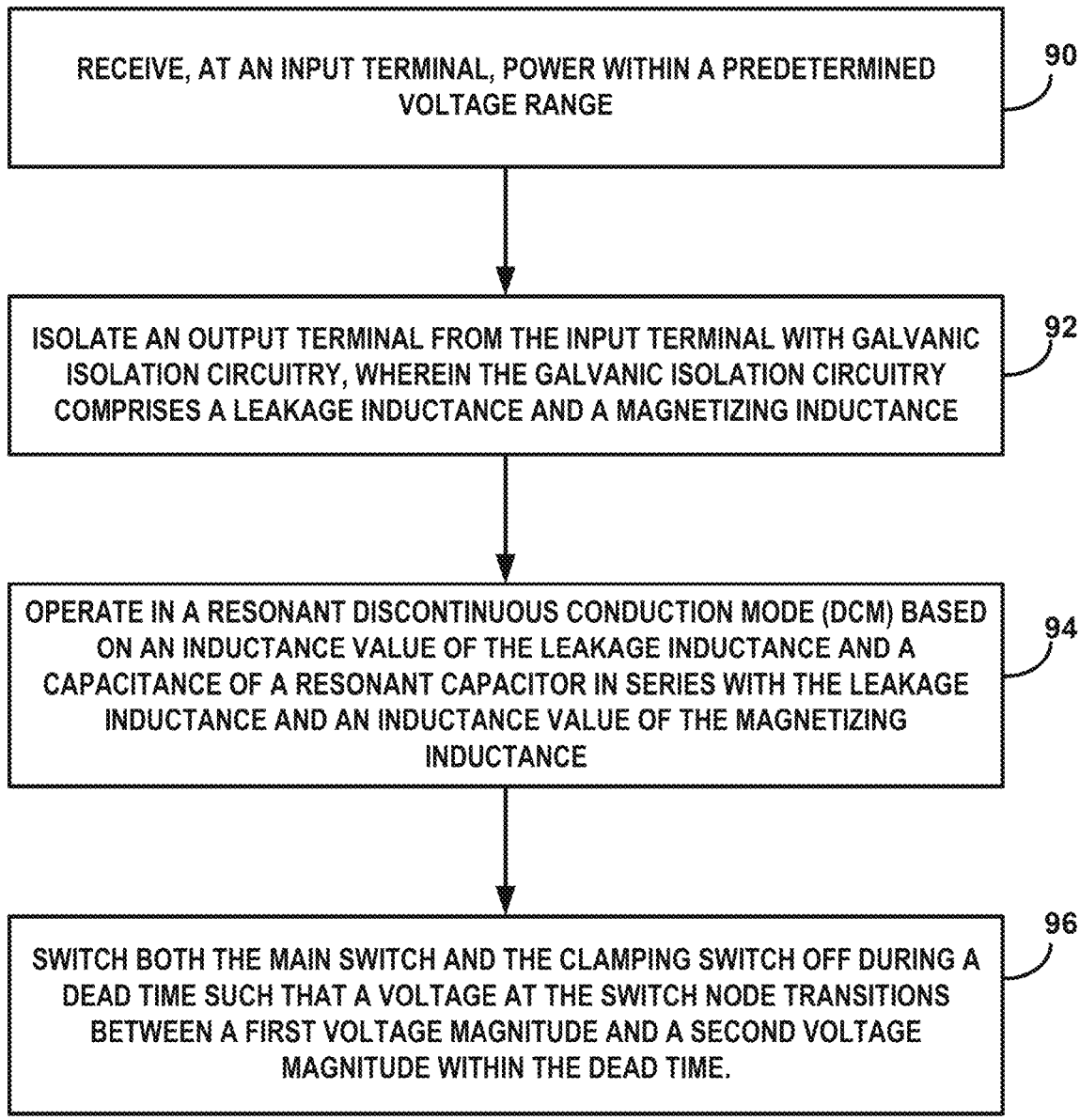
FIG. 6 is a flowchart illustrating an example operation of the ACISC of this disclosure.

FIG. 6 is a flowchart illustrating an example operation of the ACISC of this disclosure. Unless otherwise noted, the blocks of FIG. 6 will be described in terms of FIG. 2.

The ACISC of this disclosure may receive, at input terminal 236, power from Vg 268 within a predetermined voltage range (90). The voltage range may depend on the type of power source. A DC-DC converter may output power within a narrow voltage range when compared to a battery, which may output power across a wider range, depending on the depth of discharge (DoD) of the battery. For example, a nominal 12V lead-acid battery may output power between 14 V–10 V, and in some examples between 18 V–6 V.

The topology of system 200 that may isolate output terminal 238 from input terminal 236 with galvanic isolation circuitry (92). The galvanic isolation circuitry, e.g., transformer 210, may be modeled as including leakage inductance Lpe 240 and magnetizing inductance Lme 242.

The ACISC may operate in a resonant discontinuous conduction mode (DCM) based on inductance values of equivalent leakage inductance Lpe 240, and equivalent magnetizing inductance Lme 242 as well as a capacitance of resonant capacitor Cc 202. Capacitor Cc 202 is in series with the leakage inductance and the magnetizing inductance (94). Selecting main switch Q1 256, clamping switch Q2 258 and the circuit topology depicted in system 200 may determine the value of leakage inductance Lpe 240 as well as the contributions to Ceq, Q at switch node 260 from the switches. Further selection of the value of resonant capacitor Cc 202, as well as other components and circuit arrangement, may determine the resonance behavior of system 200. For example, in system 200, resonant capacitor Cc 202 connects switch node 260 to the galvanic isolation circuitry, transformer 210. Also, input inductor Lg 272 connects input terminal 236 to switch node 260 and main switch Q1 256 connects to clamping switch Q2 258 at switch node 260, all of which may contribute to the resonance behavior at different times in the switching cycle. As described above in relation to FIGS. 2, 3 and 4, when output diode D3 is ON, then Lme 242 does not participate in the resonance because of the a "constant" voltage (=–N*Vo) across Lme 242. When D3 is OFF, the circuit does not transfer power to the output terminal 238. Lme 242 participates in the resonance because it is connected in series with Cc 202 and Lpe 240.

Loop controller 220 may be configured to switch both main switch Q1 256 and clamping switch Q2 258 OFF during a dead time such that a voltage at the switch node transitions between a first voltage magnitude and a second voltage magnitude within the dead time, as described above in relation to FIG. 4 (96).

In one or more examples, the functions described above may be implemented in hardware, software, firmware, or any combination thereof. For example, processing circuitry 276 of FIG. 2 and loop controller 20 of FIG. 1 may be implemented in hardware, software, firmware, or any combination thereof. If implemented in software, the functions may be stored on a tangible computer-readable storage medium and executed by a processor or hardware-based processing unit.

Instructions may be executed by one or more processors, such as one or more digital signal processors (DSPs), general purpose microprocessors, application specific integrated circuit (ASIC), Field programmable gate array (FPGAs), or other equivalent integrated or discrete logic circuitry. Accordingly, the term "processor," and "processing circuitry" as used herein, such as may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above.

One or more aspects of this disclosure may also be described in the following numbered clauses.

Clause 1: A power converter circuit comprising a transformer configured to isolate an output terminal of the circuit from an input terminal of the circuit, wherein the transformer includes a magnetizing inductance and a leakage inductance; a resonance capacitor in series with the leakage inductance, wherein a value of capacitance for the resonance capacitor and a value for the leakage inductance configure the circuit to operate in resonant discontinuous conduction mode (DCM); a clamping switch; a main switch and a loop controller configured to: drive control terminals of the main switch and the clamping switch, operate the power converter circuit with a dead time: wherein both the main switch and the clamping switch are off, and such that a voltage at the switch node transitions between a first voltage magnitude and a second voltage magnitude within the dead time.

Clause 2: The circuit of clause 1, wherein the main switch connects the switch node to a reference node, wherein the loop controller is configured to switch ON the main switch when the voltage at the switch node is approximately zero volts, wherein the voltage at the switch node is approximately zero volts when the voltage at the switch node is within a specified tolerance of zero volts.

Clause 3: The circuit of any of clauses 1 and 2, wherein a resonant frequency of the resonant DCM is at least one megahertz (MHz).

Clause 4: The circuit of any of clauses 1 through 3, wherein the clamping switch connects the switch node of the circuit to a reference node through a snubber capacitor.

Clause 5: The circuit of clause 4, wherein the loop controller is configured to switch ON the clamping switch when the voltage at the switch node equals a voltage across the snubber capacitor.

Clause 6: The circuit of any of clauses 1 through 5, wherein an output voltage at the output terminal is rectified by an output diode.

Clause 7: The circuit of any of clauses 1 through 6, further comprising an input inductor, wherein a value of the input inductor is configured to achieve zero voltage switching (ZVS) for the main switch and the clamping switch.

Clause 8: The circuit of any of clauses 1 through 7, wherein the main switch and the clamping switch are each implemented with a Gallium Nitride (GaN) metal-oxide-semiconductor field-effect transistor (MOSFET).

Clause 9: A system comprising a power supply configured to produce a voltage within a predetermined voltage range; a power converter circuit includes a transformer configured to isolate an output terminal of the circuit from an input terminal of the circuit, wherein the transformer includes a leakage inductance and a magnetizing inductance, and wherein the input terminal is configured to receive from the power supply, the voltage within the predetermined voltage range; a resonance capacitor in series with the leakage inductance, wherein a value of capacitance for the resonance capacitor, a value for the magnetizing inductance and a value for the leakage inductance configure the circuit to operate in resonant discontinuous conduction mode (DCM); a clamping switch; a main switch; and a loop controller configured to: drive control terminals of the main switch and the clamping switch, operate the power converter circuit with a dead time: wherein both the main switch and the clamping switch are off, and such that a voltage at the switch node transitions between a first voltage magnitude and a second voltage magnitude within the dead time.

Clause 10: The system of clause 9, wherein the clamping switch connects a switching node of the power converter circuit to a reference node through a snubber capacitor.

Clause 11: The system of any of clauses 9 and 10, further comprising an input inductor, wherein a value of the input inductor is configured to achieve zero voltage switching (ZVS) for the main switch and the clamping switch.

Clause 12: The system of any of clauses 9 through 11, wherein an output voltage at the output terminal is rectified by an output diode.

Clause 13: The system of any of clauses 9 through 12, wherein the main switch and the clamping switch are each implemented with a Gallium Nitride (GaN) metal-oxide-semiconductor field-effect transistor (MOSFET).

Clause 14: The system of any of clauses 9 through 13, wherein the power supply provides power to one or more electrical loads of a vehicle; and wherein the power converter circuit is configured to supply an output voltage at a specified magnitude without regard to a magnitude of the received voltage within the predetermined voltage range.

Clause 15: The system of clause 14, wherein the vehicle is an automobile.

Clause 16: A method comprising receiving, at an input terminal, power within a predetermined voltage range; isolating an output terminal from the input terminal with galvanic isolation circuitry, wherein the galvanic isolation circuitry comprises a leakage inductance; operating in a resonant discontinuous conduction mode (DCM) based on an inductance value of the leakage inductance, an inductance value for the magnetizing inductance and a capacitance of a resonant capacitor in series with the leakage inductance; wherein the resonant capacitor connects a switch node to the galvanic isolation circuitry, wherein an input inductor connects the input terminal to the switch node, wherein a main switch connects to a clamping switch at the switching node, and switching both the main switch and the clamping switch OFF during a dead time such that a voltage at the switch node transitions between a first voltage magnitude and a second voltage magnitude within the dead time.

Clause 17: The method of clause 16, wherein the galvanic isolation circuitry comprises a transformer.

Clause 18: The method of any of clauses 16 and 17, wherein the clamping switch connects the switch node of the power converter circuit to a reference node through a snubber capacitor.

Clause 19: The method of any of clauses 16 through 18, wherein the main switch and the clamping switch are each implemented with a Gallium Nitride (GaN) metal-oxide-semiconductor field-effect transistor (MOSFET).

Clause 20: The method of any of clauses 16 through 19, wherein an output voltage at the output terminal is rectified by a synchronous rectification circuit.

Various examples of the disclosure have been described. These and other examples are within the scope of the following claims.

What is claimed is:

1. A power converter circuit, the circuit comprising:
   an input terminal;
   an output terminal;
   a transformer configured to isolate the output terminal of the circuit from the input terminal of the circuit, wherein the transformer includes a leakage inductance and a magnetizing inductance;
   a resonance capacitor in series with the leakage inductance, wherein a value of capacitance for the resonance capacitor, a value for the magnetizing inductance and a value for the leakage inductance configure the circuit to operate in resonant discontinuous conduction mode (DCM);
   a switch node;
   a clamping switch;
   a main switch; and a loop controller configured to:
   drive control terminals of the main switch and the clamping switch; and
   operate the power converter circuit with a dead time:
      wherein both the main switch and the clamping switch are off during the dead time, and
      wherein a voltage at the switch node transitions between a first voltage magnitude and a second voltage magnitude within the dead time.

2. The circuit of claim 1,
wherein the main switch connects the switch node to a reference node,
wherein the loop controller is configured to switch ON the main switch when the voltage at the switch node is approximately zero volts, and
wherein the voltage at the switch node is approximately zero volts when the voltage at the switch node is within a specified tolerance of zero volts.

3. The circuit of claim 1, wherein a resonant frequency of the resonant DCM is at least one megahertz (MHz).

4. The circuit of claim 1, wherein the clamping switch connects the switch node of the circuit to a reference node through a snubber capacitor.

5. The circuit of claim 4, wherein the loop controller is configured to switch ON the clamping switch when the voltage at the switch node equals a voltage across the snubber capacitor.

6. The circuit of claim 1, wherein an output voltage at the output terminal is rectified by an output diode.

7. The circuit of claim 1, further comprising an input inductor, wherein a value of the input inductor is configured to achieve zero voltage switching (ZVS) for the main switch and the clamping switch.

8. The circuit of claim 1, wherein the main switch and the clamping switch are each implemented with a Gallium Nitride (GaN) metal-oxide-semiconductor field-effect transistor (MOSFET).

9. A system comprising:
   a power supply configured to produce a voltage within a predetermined voltage range;
   a power converter circuit, the circuit comprising:
      an input terminal configured to receive from the power supply, the voltage within the predetermined voltage range;
      an output terminal;
      a transformer configured to isolate an output terminal of the circuit from an input terminal of the circuit, wherein the transformer includes a leakage inductance and a magnetizing inductance;
      a resonance capacitor in series with the leakage inductance, wherein a value of capacitance for the resonance capacitor, a value for the magnetizing inductance and a value for the leakage inductance configure the circuit to operate in resonant discontinuous conduction mode (DCM);
      a switch node;
      a clamping switch;
      a main switch; and
      a loop controller configured to:
         drive control terminals of the main switch and the clamping switch;
         operate the power converter circuit with a dead time:
            wherein both the main switch and the clamping switch are off during the dead time, and
            wherein a voltage at the switch node transitions between a first voltage magnitude and a second voltage magnitude within the dead time.

10. The system of claim 9, wherein the clamping switch connects a switching node of the power converter circuit to a reference node through a snubber capacitor.

11. The system of claim 9, further comprising an input inductor, wherein a value of the input inductor is configured to achieve zero voltage switching (ZVS) for the main switch and the clamping switch.

12. The system of claim 9, wherein an output voltage at the output terminal is rectified by an output diode.

13. The system of claim 9, wherein the main switch and the clamping switch are each implemented with a Gallium Nitride (GaN) metal-oxide-semiconductor field-effect transistor (MOSFET).

14. The system of claim 9,
wherein the power supply provides power to one or more electrical loads of a vehicle; and
wherein the power converter circuit is configured to supply an output voltage at a specified magnitude without regard to a magnitude of the received voltage within the predetermined voltage range.

15. The system of claim 14, wherein the vehicle is an automobile.

16. A method comprising:
   receiving, at an input terminal of a power converter circuit, power within a predetermined voltage range;
   isolating an output terminal of the power converter circuit from the input terminal with galvanic isolation circuitry, wherein the galvanic isolation circuitry comprises a leakage inductance;
   operating in a resonant discontinuous conduction mode (DCM) based on an inductance value of the leakage inductance, an inductance value for the magnetizing inductance and a capacitance of a resonant capacitor in series with the leakage inductance;
      wherein the resonant capacitor connects a switch node to the galvanic isolation circuitry,
      wherein an input inductor connects the input terminal to the switch node,
      wherein a main switch connects to a clamping switch at the switching node, and
   switching both the main switch and the clamping switch OFF during a dead time, wherein a voltage at the switch node transitions between a first voltage magnitude and a second voltage magnitude within the dead time.

17. The method of claim 16, wherein the galvanic isolation circuitry comprises a transformer.

18. The method of claim 16, wherein the clamping switch connects the switch node of the power converter circuit to a reference node through a snubber capacitor.

19. The method of claim 16, wherein the main switch and the clamping switch are each implemented with a Gallium Nitride (GaN) metal-oxide-semiconductor field-effect transistor (MOSFET).

20. The method of claim 16, wherein an output voltage at the output terminal is rectified by a synchronous rectification circuit.

* * * * *